United States Patent [19]

Brouard et al.

[11] 4,045,423
[45] Aug. 30, 1977

[54] CHROMIUM COMPLEXES OF PHENYLAZOPYRAZOLYL OR PHENYLAZONAPHTHOL DYESTUFFS AND ACETYLACETONE

[75] Inventors: Claude Marie Henri Emile Brouard, Sotteville les Rouen; Paulette Gisele Ficht, Mont Saint Aignan, both of France

[73] Assignee: Produits Chimiques Ugine Kuhlmann, Paris, France

[21] Appl. No.: 445,183

[22] Filed: Feb. 25, 1974

[30] Foreign Application Priority Data

Mar. 2, 1973    France ............................... 73.07457

[51] Int. Cl.² .................... C09B 45/16; D06P 1/10; D06P 3/24
[52] U.S. Cl. .............................. 260/147; 260/146 R; 260/149; 260/151
[58] Field of Search ............... 260/147, 149, 150, 151

[56]    References Cited
    U.S. PATENT DOCUMENTS

| 2,708,193 | 5/1955 | Pfitzner et al. | 260/147 |
|---|---|---|---|
| 2,871,232 | 1/1959 | Csendes | 260/147 |
| 3,356,671 | 12/1967 | Johnson et al. | 260/147 X |
| 3,544,545 | 12/1970 | Idelson | 260/147 |
| 3,551,406 | 12/1970 | Idelson | 260/147 |
| 3,728,328 | 4/1973 | Lienhard et al. | 260/147 |

OTHER PUBLICATIONS

Idelson et al. (I), J. Am. Chem. Soc., vol. 88, pp. 186 to 187, (1966).
Idelson et al. (II), Inorganic Chemistry, vol. 6, pp. 450 to 458, (1967).

*Primary Examiner*—Floyd D. Higel
*Attorney, Agent, or Firm*—Beveridge, DeGrandi, Kline & Lunsford

[57]    ABSTRACT

Monoazo chromiferous dyestuff of the formula:

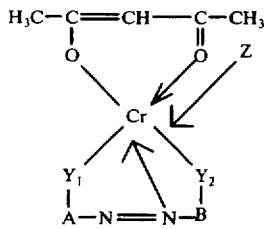

(I)

in which A represents phenylene which is unsubstituted or monosubstituted by nitro, chloro or sulpho, or disubstituted by nitro and sulpho or chloro and sulpho or methyl and nitro or chloro and chloro, B represents 1-phenyl-3-methyl-5-pyrazolyl monosubstituted on the phenyl by sulpho, chloro or ethyl, ethylidene acetanilide, hydroxyquinolidene, hydroxyphenylene, naphthylene substituted by one sulpho or one methyl, one of A or B is substituted by sulpho, $Y_1$ represents —O— or

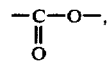

$Y_2$ represents —O— or

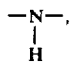

$Y_1$ and $Y_2$ are each in a vicinal position with respect to azo, and Z is water, ammonia and pyridine.

6 Claims, No Drawings

CHROMIUM COMPLEXES OF PHENYLAZOPYRAZOLYL OR PHENYLAZONAPHTHOL DYESTUFFS AND ACETYLACETONE

The present invention relates to new complex chromiferous monoazo dyestuffs, to a process for their preparation and to their use in the colouration of polyamides.

These new complex chromiferous dyestuffs correspond to the following general formula:

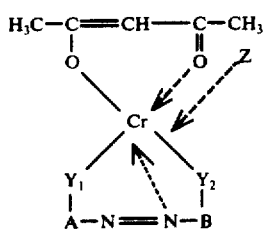
(I)

in which A represents the residue of a diazotisable amine of the benzene series of the formula H—$Y_1$—A—$NH_2$, B represents the residue of a coupling compound of the benzene, naphthalene, quinoline, acetoacetanilide or the pyrazolone series of the formula H—B—$Y_2$—H, one of the residues A or B carrying a sulphonic acid group, $Y_1$ represents —O— or

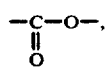

$Y_2$ represents —O— or

$Y_1$ and $Y_2$ are each in a vicinal position with respect to the azo group, D is the residue of a β-diketone bidentate chelating agent and Z is a mono-functional electrically neutral ligand.

The new dyestuffs carry in their molecule only one sulphonic acid group.

By "vicinal position" is meant not only the ortho or alpha position, but also the peri position.

Acetylacetone is the preferred bidentate chelating agent D according to the invention, but the β-diketones which are homologues thereof such as for example hexane-3,5-dione, may also be used.

It is understood that if $Y_1$ is

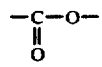

then the carbon atom is directly linked to the group A.

The monofunctional neutral ligand Z may be a molecule of water, ammonia or an organic base.

The groups $Y_1$ and $Y_2$ occupy respectively the vicinal position with respect to the group —N=N—.

The invention also relates to a process for the preparation of the new complex chromiferous dyestuffs defined above, in which a β-diketone bidentate chelating agent is reacted with a 1:1 chromium complex of a dyestuff of the general formula:

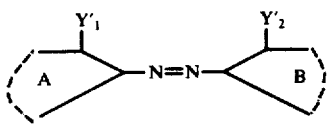
(II)

in the presence of water, ammonia, a mineral or organic base or a mixture of these ligands, A and B being as defined above, $Y'_1$ representing a hydroxy, methoxy, or carboxy group and $Y'_2$ representing a hydroxy or amino group, $Y'_1$ and $Y'_2$ being respectively in a vicinal position with regard to the group —N=N—. The reaction takes place in aqueous medium, and preferably in alkaline medium, and the operation is generally effected at a temperature of from 20° C. to 100° C. The yields are generally excellent.

A large number of dyestuffs of the formula (II) are already known of themselves, as well as their 1:1 chromium complex, to which may be attributed a structure corresponding to the general formula:

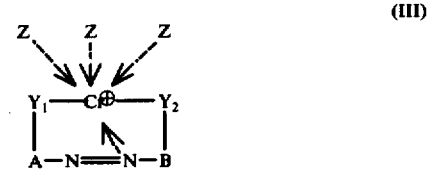
(III)

in which A, B, $Y_1$ and $Y_2$ and Z have the significance already defined above.

The dyestuffs of formula (III) may easily be obtained for example by heating a dyestuff of formula (II) with a trivalent chromium salt such as for example chromic chloride or basic chromium sulphate in aqueous medium at from 90° C. to 150° C.

The new dyestuffs are distinguished from the starting 1:1 complexes by very different and very valuable tinctorial properties, in particular in the colouration of natural or synthetic polyamides. In fact, it is known that the 1:1 complexes of chromium are only able to colour the natural or synthetic polyamides in a strongly acid bath i.e. having a pH below 4 (generally sulphuric acid), and this causes the fibres to deteriorate and modifies their handle (Synthetic dyes by Venkataraman, Volume III, p. 305). The new complexes have the advantage of being able to dye or print natural or synthetic polyamides in a neutral to weakly acid i.e. having a pH of 4 or above, medium and consequently permit one to make the most of the properties of the fibres.

Further, the brilliancy of the shades is most frequently superior to that of the initial 1:1 chromium complexes, and the exhaustion of the bath and tinctorial yields are good, even excellent.

Surprisingly these advantages of brilliancy and exhaustion and tinctorial yield peculiar to the invention could not have been obtained if the β-diketone chelating agent according to the invention had been replaced by an other bidentate chelating agent such as 8-hydroxy-quinolines.

The fastness to wet tests and especially to light of the dyestuff of the invention are excellent, and the stability to heat is very good.

It could not be foreseen that the remarkable fastness of the new dyestuffs could not have been attained if the initial dyestuffs (II) of the invention had been replaced by other initial dyestuffs derived from naphthyl-azo-pyrazolones.

It is surprising that acid dyestuffs such as those of the present invention enable natural or synthetic polyamides to be dyed in a neutral to weakly acid medium and the advantageous results described above to be obtained.

The dyestuffs of the invention may be applied with particular advantage to the dyeing or printing of natural or synthetic polyamides, more especially in the presence of water at a pH between 4 and 7.

The invention also relates to natural or synthetic polyamides dyed or printed by means of the new dyestuffs.

The invention is illustrated by the following Examples, in which the parts are parts by weight.

EXAMPLE 1

52.2 parts of the 1/1 chromium complex of the monoazo dyestuff [3-sulpho-5-nitro-2-hydroxy-benzene] < 1 azo 4 > [1-phenyl-3-methyl-5-pyrazolone] are made into a paste in 300 parts of water. 11.7 parts of acetylacetone are added, then 20 parts of sodium carbonate. The mixture is heated at 40° C. while stirring for half an hour. The end of the condensation is checked by chromatography, then the dyestuff is salted out with 50 parts of sodium chloride, filtered off and dried. The dyestuff obtained has the formula:

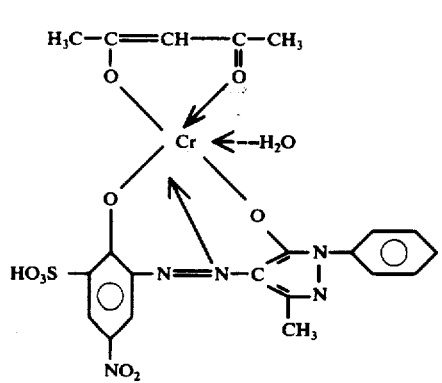

(IV)

a methyl group in the 3 position of the pyrazolone ring.

It dyes polyamides in an orange shade of good general fastness. In this Example, the sodium carbonate may be replaced by 13.4 parts of 25% ammonia or 35 parts of pyridine. In this case the ammonia or the pyridine replace the water in the above formula. Whether pyridine, ammonia or water is taken as ligand, it is found that in the three cases the shade and fastness obtained are the same.

EXAMPLE 2

50.6 parts of the 1/1 complex of chromium of the monoazo dyestuff [2-carboxy-benzene] <1 azo 4 >[1-(4'-sulpho)phenyl3-methyl-5-pyrazolone] in 150 parts of water are heated to 90° C. 14 parts of acetylacetone and 35 parts of pyridine are added. The heating is maintained for 2 hours. After cooling, the dyestuff is filtered off, then dried, the yield being practically quantitative. It dyes polyamides a yellow shade of good general fastness.

EXAMPLE 3

0.1 parts of the dyestuff of Example 1 are dissolved in 100 parts of water containing 0.5 parts of 10% acetic acid. At 50° C. 5 parts of polyamides or wool are added, the temperature is raised to 100° C. over a period of half an hour and maintained at the boil for an hour. A bluish red shade is obtained which has very good general fastness.

On operating in an analogous manner to that described in Examples 1 or 2 there are obtained starting from the 1/1 chromium complexes of the monoazo dyestuffs of which the diazotisation compounds and the coupling compounds are indicated in columns II and III of the following Table, the shades on polyamides given in column IV.

| I Ex. | II Diazotisation compound | III Coupling compound | IV Shade |
|---|---|---|---|
| 4 | anthranilic acid | 1-(3'-sulpho)phenyl-3-methyl-5-pyrazolone | yellow |
| 5 | " | 1-(5'-sulpho-2'-chloro)phenyl-3-methyl-5-pyrazolone | yellow |
| 6 | " | 1-(2'-ethyl)phenyl-3-methyl-5-pyrazolone | yellow |
| 7 | 5-sulpho-anthranilic acid | 1-(3'-chloro)phenyl-3-methyl-5-pyrazolone | yellow |
| 8 | " | 1-(4'-chloro)phenyl-3-methyl-5-pyrazolone | yellow |
| 9 | 3,5-dichloro-anthranilic acid | 1-(4'-sulpho)phenyl-3-methyl-5-pyrazolone | yellow |
| 10 | " | 1-(3'-sulpho)phenyl-3-methyl-5-pyrazolone | yellow |
| 11 | 4-nitro-6-sulpho-2-aminophenol | Acetoacetanilide | yellow |
| 12 | 4-nitro-2-amino-phenol | 1-(4'-sulpho)phenyl-3-methyl-5-pyrazolone | orange |
| 13 | " | 1-(3'-sulpho)phenyl-3-methyl-5-pyrazolone | orange |
| 14 | 4-sulpho-6-nitro-2-amino-phenol | 1-phenyl-3-methyl-5-pyrazolone | scarlet |
| 15 | 4-chloro-2-amino-phenol | 1-(4'-sulpho)phenyl-3-methyl-5-pyrazolone | red |
| 16 | " | 1-(3'-sulpho)-phenyl-3-methyl-5-pyrazolone | red |
| 17 | 4,6-dichloro-2-amino-phenol | 1-(4'sulpho)phenyl-3-methyl-5-pyrazolone | red |
| 18 | 4,6-dichloro-2-amino-phenol | 1-(3'-sulpho)phenyl-3-methyl-5-pyrazolone | red |
| 19 | 4-sulpho-6-nitro-2-amino-phenol | 2,4-dihydroxy-quinoline | red |
| 20 | 4-methyl-6-nitro-2-amino-phenol | 1-(4'-sulpho)phenyl-3-methyl-5-pyrazolone | red |
| 21 | 4-chloro-6-sulpho-2-amino-phenol | 2,4-dihydroxy-quinoline | bordeaux |
| 22 | 4-sulpho-6-nitro-2-amino-phenol | resorcinol | bordeaux |
| 23 | 5-nitro-2-amino-phenol | 5-sulpho-1-naphthol | blue |
| 24 | 4-chloro-6-sulpho-2-amino-phenol | 4-methyl-1-naphthol | blue |
| 25 | 5-nitro-2-amino-phenol | 6-sulpho-2-naphthyl-amine | green |

As will be seen from the foregoing examples, the group "A" in formula I may represent phenylene which is unsubstituted or monosubstituted by nitro, chloro or sulpho, or disubstituted by nitro and sulpho or by chloro and sulpho or by methyl and nitro or by chloro and chloro. B represents 1-phenyl-3-methyl-5-pyrazolyl monosubstituted on the phenyl group by sulpho, chloro or ethyl, ethylidiene acetanilide, hydroxyquinolidene or hydroxyphenylene, naphthalene substituted by one sulpho or one methyl; one of A or B is substituted by sulpho.

We claim:

1. A dyestuff represented by the following structure:

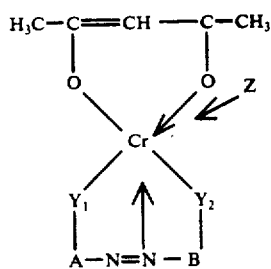

in which A represents phenylene which is unsubstituted or monosubstituted by nitro, chloro or sulpho, or disubstituted by nitro and sulpho or chloro and sulpho or methyl and nitro or chloro and chloro, B represents 1-phenyl-3-methyl-5-pyrazolyl which may be monosubstituted on the phenyl by sulpho, chloro or ethyl; or 1,2 naphthalene, one of A or B is substituted by sulpho, $Y_1$ represents -O- or

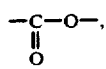

$Y_2$ represents -O- or

$Y_1$ and $Y_2$ are each in a vicinal position with respect to azo, and Z is water, ammonia or pyridine.

2. Dyestuff according to claim 1 of the formula:

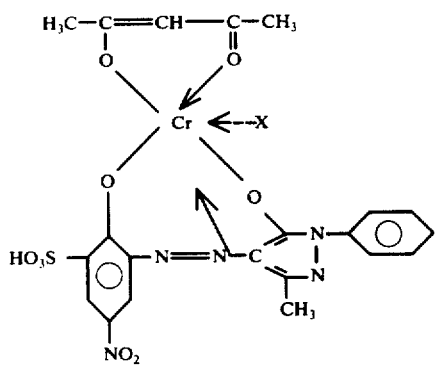

(V)

wherein X is water ammonia or pyridine.

3. Dyestuff according to claim 1 of the formula:

(VI)

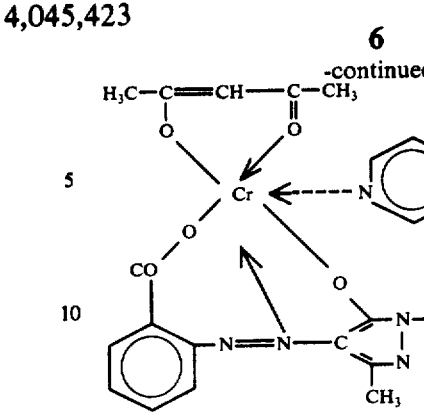

4. Dyestuff according to claim 1 of the formula:

(VII)

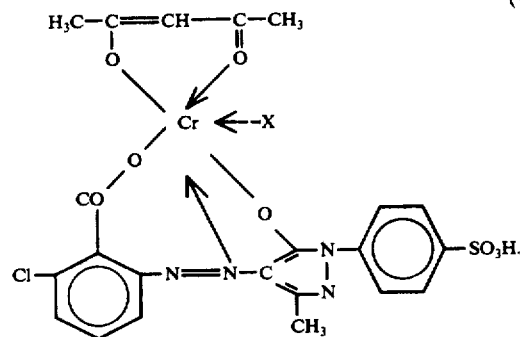

wherein X is water, ammonia or pyridine.

5. Dyestuff according to claim 1 of the formula:

(VIII)

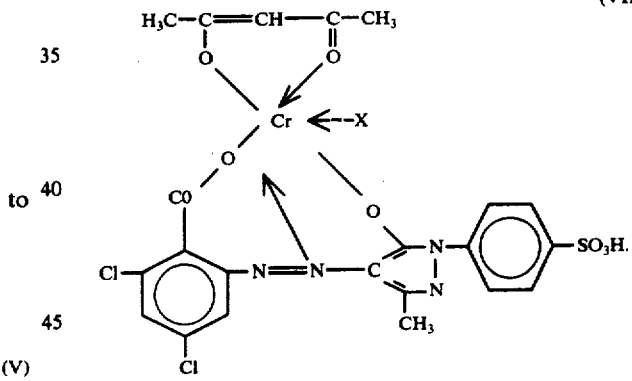

wherein X is water ammonia or pyridine.

6. Dyestuff according to claim 1 of the formula:

(XI)

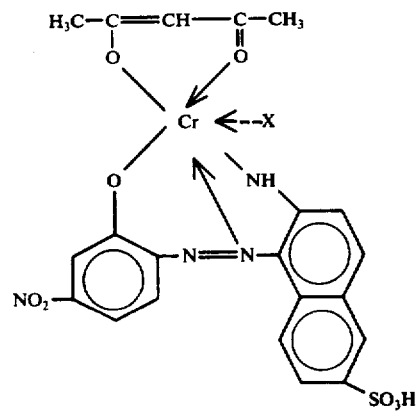

wherein X is water, ammonia or pyridine.

* * * * *